C. PERLEY.
Gun-Carriage.
No 37,766.
Patented Feb. 24, 1863.
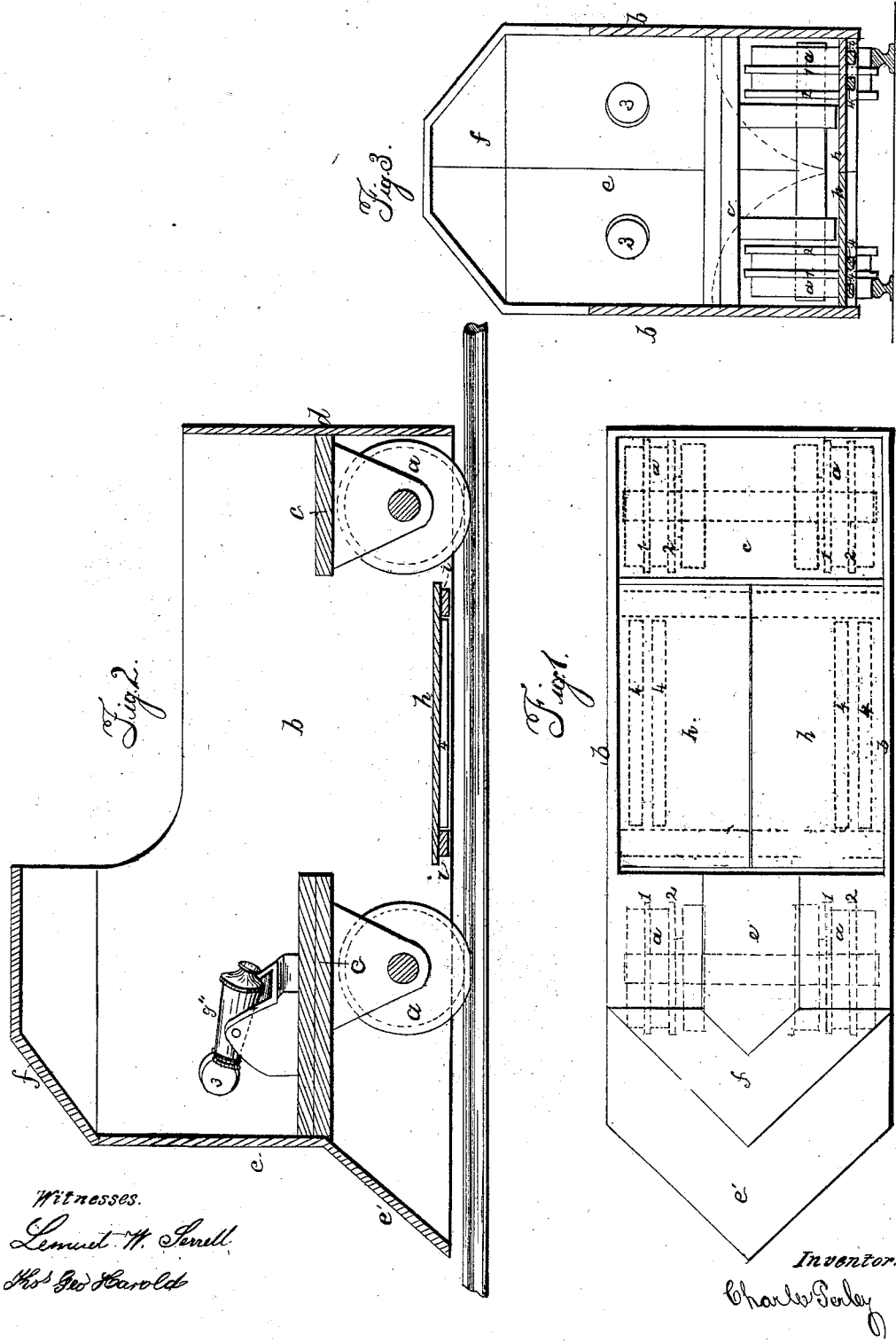
Witnesses.
Lemuel W. Serrell
Thos Geo Harold
Inventor.
Charles Perley

UNITED STATES PATENT OFFICE.

CHARLES PERLEY, OF NEW YORK, N. Y.

IMPROVEMENT IN TRAVELING BATTERIES.

Specification forming part of Letters Patent No. 37,766, dated February 24, 1863.

*To all whom it may concern:*

Be it known that I, CHARLES PERLEY, of the city and State of New York, have invented and made a certain new and useful Improvement in Traveling Batteries; and I do hereby declare that the following is a full, clear, and exact description of the said invention, reference being had to the annexed drawings, making part of this specification, wherein—

Figure 1 is a plan of said battery. Fig. 2 is a longitudinal section, and Fig. 3 is a cross-section Similar marks of reference denote the same parts.

The nature of my said invention consists in a battery constructed in such a manner as to be strong and adapted for conveyance from place to place upon railways or upon ordinary roads, the exterior being adapted to protect the men within, while the interior is provided with means that enable the occupants to draw their own battery or repair a railroad-track without being exposed.

In the drawings, *a a* are pairs of wheels or trucks, made in any usual manner. The wheels themselves, however, are to be made quite broad, so as to take sufficient bearing for traveling upon ordinary roads. 1 1 are the flanges adapted to the railroad-track traveled upon, and in cases where considerable difference exists in the tracks a second flange, 2, is to be provided, so as to fit a different gage of railroad.

*b b* are the sides of the battery, sustained upon the wheels by the cross-pieces *c c*.

*d* is the rear end, and *e* is the front end, of the battery. This latter is formed as an angle or V shape, with an inclined plane, *e'*, at each side corresponding to a cow-catcher, to remove obstructions, and with an angular covering, *f*.

*g* is a cannon fitted on a carriage or swivel, and 3 3 are port-holes that may be provided with covers.

*h* is the platform of the car, formed in two or more sections sustained upon cross-supports *i i*, as low down as convenient to the track or ground.

It will now be seen that the cannon or cannons at the front end of this battery can be used for clearing a street or road from a mob or from military, and that the men in the battery are effectually protected by the ends and sides. At the same time the height of the sides is to be only enough to allow of firing over the same, or loop-holes may be provided for this purpose.

In cases of necessity the platform-sections *h* may be turned up against the sides to afford additional protection, or to give access to the track for the purposes of repair, or for the soldiers to walk upon and draw the battery along or move it from place to place.

I provide rails 4 4 upon the platform-sections *h h*, adapted to receive the wheels *a a*, so that these platforms may be used as a means for replacing the battery if thrown off the track, or for temporary support for the battery.

I prefer that the sides and ends of this traveling battery be made of sheets of steel, or of metal of sufficient thickness to withstand the balls, either alone or upon a wooden casing.

One of these batteries in front of a locomotive and another behind could be used to keep a large distance of railroad in good order, even through a hostile section of country, and at the same time protect and transport troops and provisions.

What I claim, and desire to secure by Letters Patent, is—

1. The traveling battery specified, provided with the V-shaped end *e* and inclines *e'*, as set forth.

2. The arrangement of the movable platform-sections *h h*, as and for the purpose specified.

3. Providing the movable platform-sections *h h* with the rails 4 4, for the purposes and as set forth.

In witness whereof I have hereunto set my signature this 17th day of May, 1861.

CHARLES PERLEY.

Witnesses:
LEMUEL W. SERRELL,
THOS. GEO. HAROLD.